Figures 1, 2:
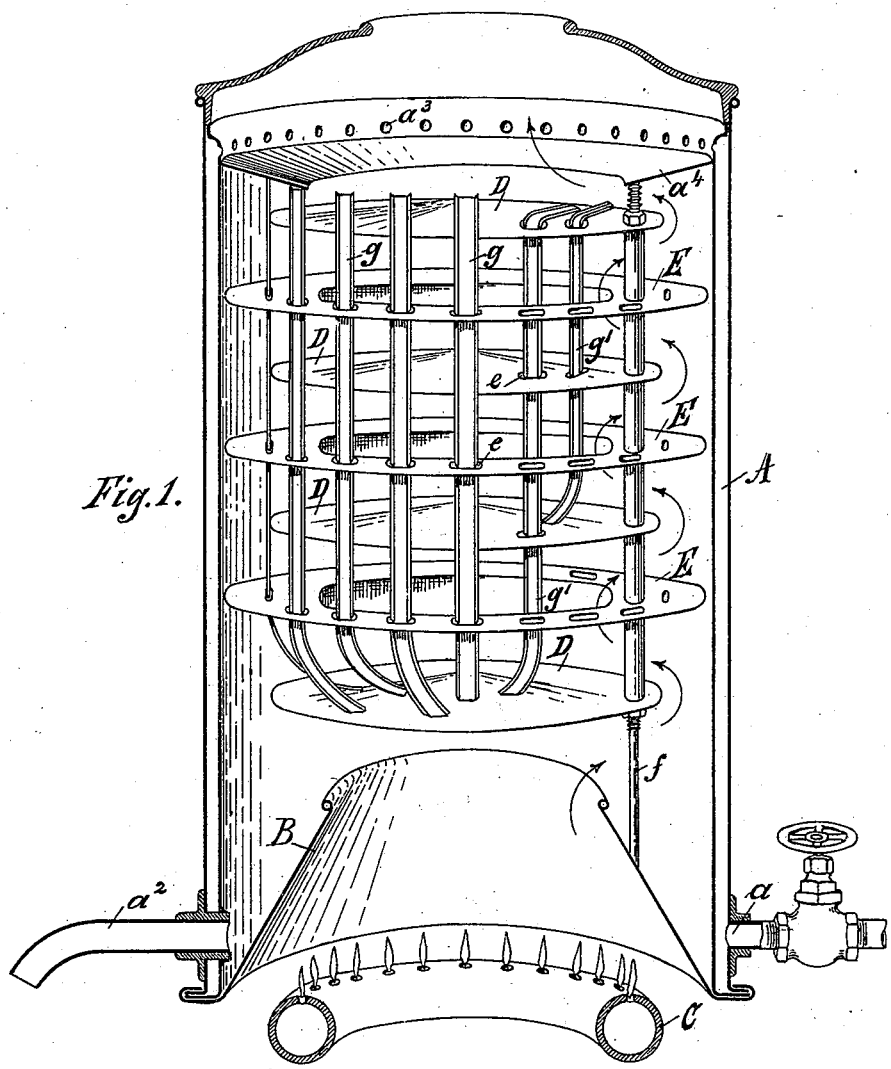

(No Model.)

H. HAEBERLIN.
WATER HEATER.

No. 554,679. Patented Feb. 18, 1896.

WITNESSES:
Myron B. Vorce.
Roland Rider.

INVENTOR
Hermann Haeberlin.

BY
C. M. Vorce
ATTORNEY.

UNITED STATES PATENT OFFICE.

HERMANN HAEBERLIN, OF CLEVELAND, OHIO.

WATER-HEATER.

SPECIFICATION forming part of Letters Patent No. 554,679, dated February 18, 1896.

Application filed June 22, 1895. Serial No. 553,636. (No model.)

*To all whom it may concern:*

Be it known that I, HERMANN HAEBERLIN, a citizen of the United States, residing at Cleveland, in the county of Cuyahoga and State of Ohio, have invented certain new and useful Improvements in Water-Heaters; and I do hereby declare the following to be a full, clear, and exact description of the invention, such as will enable others skilled in the art to which it appertains to make and use the same.

My invention relates to devices for rapidly and continuously heating water. Its object is to improve the construction and increase the efficiency of the apparatus; and it consists in the novel construction, arrangement and combination of parts designed to attain such object, as hereinafter fully described and pointed out in the claims.

In the drawings, Figure 1 represents in central vertical section a water-heater embodying my invention, the water-distributing parts being shown in perspective in place within the shell or body of the heater. Fig. 2 is a detail showing the relation of the strips $g\ g'$ to the openings in the disks D and plates E.

A represents the inclosing shell or body of the heater, preferably constructed with double parallel or concentric walls, whereby a narrow space or water-channel is formed within the body A, which is provided with a water-inlet $a$, preferably at or near the bottom of the shell, and with an outlet $a^2$ communicating with the interior chamber of the body at the bottom. At the top of the shell A the annular space between the walls communicates with the interior chamber of the shell through the perforations $a^3$, below which there is affixed to the inner wall of the body A an inward-extending annular flange $a^4$, slightly inclined downward toward its inner edge, for a purpose presently to be described. The annular space between the walls of the body A may be left entirely free and unobstructed, as I prefer to do, or it may, if desired, be divided by partitions or stays, or divided into separate channels, which, however, should open into an unobstructed annular space extending entirely around the shell A at the top where the perforations $a^3$ are located in order to insure an equal centripetal discharge of the water.

The body or shell A is provided with a bottom in the form of a truncate hollow cone B, whose open top is made preferably of about one-half the diameter of the body A. Below this cone B is to be located any suitable source of heat, such as a gas or oil burner C, which may be affixed to and form part of the heater, or the latter may be placed over a detached fire or burner, as may be most convenient.

Within the shell or body A is arranged a water and heat distributing system or structure, arranged as follows: A series of disks D D, having a diameter about three-quarters that of the interior of shell A, are arranged alternately with flat rings or annular plates E E upon supports $f\ f$, to which both the disks D and rings E are firmly affixed, so that they are supported at a sufficient distance apart to allow of a free circulation of the heat between them. The rings or annular plates E are of an exterior diameter nearly equal to the interior of shell A and have their central opening preferably as large or larger than the opening in the conical bottom B. The supports $f\ f$ extend below the lower disk D, as shown, and rest upon the bottom of the shell A, so as to support the disk D, which forms the lower member of the heat-distributing system, over and a little above the open top of the cone B.

Through the annular plates E are pierced openings $e$, through which openings water-conducting strips $g\ g$ are passed, extending outside of and in close contiguity to the edges of the disks D. The upper ends of these strips $g$ extend above the upper disk D, and their lower ends are preferably incurved and rest upon or in close proximity to the upper surface of the lowermost disk D, which, being just above the top of cone B, receives the first impact of the heat from the burner C and is therefore the hottest of all the disks D.

Although not essential, I find it very advantageous to distribute the water well over the surface of the lower disk D, and to that end I curve the lower ends of alternate strips $g\ g$ more than the intermediate ones, so that each alternate strip terminates nearer to the center of the disk, as seen.

As thus far described the apparatus is perfectly effective; but I prefer to employ a second series of conducting-strips similar to the strips g g and located interior to the annular plates E. This second series of strips, g' g', pass through the disk D and through the central opening of the plates E E and terminate upon the lower plate D near its center. Should it be thought best a part of the inner series of strips g' may be made to terminate upon the disk D next above the lower one, this construction being a mere optional modification. The tops of the strips g' are bent back to catch the water dripping from $a^4$.

The strips g g' may be flat, in which case the openings e should be angular or irregular to allow of a free passage for the water flowing down the strips; but I prefer to make the openings e oblong and to corrugate or channel the strips, as seen in Fig. 2, so as to not only strengthen the strips but afford clearance for the water, while at the same time causing the strips to firmly and snugly seat in the openings.

In the operation of the device the water entering through the perforations $a^3$ and falling on the flange $a^4$ escapes thence in a thin continuous sheet upon the uppermost disk D, where by the outward inclination of the disk it is distributed to all the strips g g', and by capillary action passes down the same, chiefly on the inner channeled surface thereof, finally reaching the lowermost and hottest of the disks D, from the outer edge of which it drips upon the still hotter cone B, and, flowing down the same, escapes at the outlet $a^2$. The heat passes up through the cone B against the center of the lower disk D, which it quickly heats, and, passing up around the edge of this disk, strikes the inner wall of shell A and the under side of the lower ring E at the angle where they approach or meet. Thence the ascending heat-currents pass under and through the lower ring and against the center of the next disk, thence around the same through the next ring, and so on to the top, where only cold air is found escaping from the open top of the body A, all the heat having been taken up by the descending water and the interior structure of the apparatus, which is composed by preference of thin sheet metal of high thermal conductivity—as, for instance, sheet-copper.

What I claim as my invention, and desire to secure by Letters Patent, is—

1. In a water-heater the combination of the shell or body having a water-inlet at the bottom and a communicating space or channel within the body-wall connecting said inlet with an annular interiorly-perforate space at the top of the shell, a deflecting-flange within the body below said perforations, a conical open bottom to said shell and a heating device below the same, a series of disks alternating with annular plates supported with the lower disk above the open conical bottom of the body, a series of conducting-strips passing through the annular plates and terminating upon the lower disk and an outlet from the interior of the heater for the heated water, substantially as described.

2. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, a series of conducting-strips passing through the annular plates and terminating on the lower disk, a water-inlet to the space between the shells, and an outlet from the interior of the heater for the discharge of the heated water, substantially as described.

3. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, a series of conducting-strips passing through the annular plates and terminating at the lower disk, an inner series of conducting-strips passing through the upper disks and terminating on the lower disk, a water-inlet to the space between the shells, and an outlet from the interior of the heater for the discharge of the heated water, substantially as described.

4. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, a series of channeled conducting-strips passing through the annular plates and terminating on the lower disk, a water-inlet to the space between the shells, and an outlet from the interior of the heater for the discharge of the heated water, substantially as described.

5. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, a series of channeled conducting-strips passing through the annular plates and terminating on the lower disk, an inner series of conducting-strips passing through the upper disks and terminating in part on the lower disk and in part on the disk next above, a water-inlet to the space between the shells, and an outlet from the interior of the heater for the discharge of the heated water, substantially as described.

6. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, with one of the disks at the top and another at the bottom of the series, a series of conducting-strips passing through the annular plates and terminating on the lower disk, a water-inlet to the space between the shells, and an outlet from the interior of the heater for the discharge of the heated water, substantially as described.

7. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, with one of the disks at the top and another at the bottom of the series, a series of conducting-strips extending above the upper disk and passing through the annular plates and terminating on the lower disk, a water-inlet to the space between the shells, and an outlet from the interior of the heater for the discharge of the heated water, substantially as described.

8. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, with one of the disks at the top and another at the bottom of the series, a series of conducting-strips extending above the upper disk and passing through the annular plates, in line with the edges of the disks, and terminating on the lower disk, a water-inlet to the space between the shells, and an outlet from the interior of the heater for the discharge of the heated water, substantially as described.

9. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, an outer series of channeled conducting-strips passing through the annular plates in line with the edges of the disks and terminating on the lower disk, an inner series of similar strips passing through the upper disks and terminating in part on the lower disk and in part on the one next above, a water-inlet to the space between the shells, and an outlet from the interior of the heater for the discharge of the heated water, substantially as described.

10. In a water-heater the combination of the shell or body having double walls with a water-space between and internally perforate at its upper part, an annular flange within the body below said perforations, an open conical bottom to said shell and a burner or equivalent heating device beneath the same, a series of disks of less diameter than the body alternating with annular plates of larger external diameter than the disks and supported above the open bottom of the shell, an outer series of channeled conducting-strips passing through the annular plates in line with the edges of the disks and terminating on the lower disk, an inner series of similar strips passing through the upper disks, bent outward at the top, and terminating in part on the lower disk and in part on the one next above, a water-inlet to the space between the shells, and an outlet from the interior of the heater for the discharge of the heated water, substantially as described.

In testimony whereof I hereto affix my signature in presence of two witnesses.

HERMANN HAEBERLIN.

Witnesses:
ROLAND RIDER,
WM. G. TAYLOR.